United States Patent
Whiteside et al.

(10) Patent No.: US 6,173,933 B1
(45) Date of Patent: Jan. 16, 2001

(54) MULTI-POSITION ARTICULATING MOUNTING APPARATUS FOR AN ELECTRONIC DEVICE

(75) Inventors: John B. Whiteside, Lenexa; David Laverick, Overland Park, both of KS (US)

(73) Assignee: Garmin Corporation (TW)

( * ) Notice: Under 35 U.S.C. 154(b), the term of this patent shall be extended for 0 days.

(21) Appl. No.: 09/208,348

(22) Filed: Dec. 9, 1998

(51) Int. Cl.⁷ .................................................. E04G 3/00
(52) U.S. Cl. ............................... 248/276.1; 248/280.11; 248/282.1
(58) Field of Search ..................... 248/276.1, 278.1, 248/291.1, 284.1, 292.12, 918, 920, 921, 118.3, 309.1, 310, 280.11, 282, 289.11

(56) References Cited

U.S. PATENT DOCUMENTS

| | | | |
|---|---|---|---|
| D. 312,650 | 12/1990 | Charrier | D16/242 |
| D. 314,713 | 2/1991 | Ciranny et al. | D10/65 |
| 600,535 | 3/1898 | Homan . | |
| 1,638,716 | 8/1927 | Surles . | |
| 2,371,451 | 3/1945 | Larson | 248/226 |
| 2,528,201 | 10/1950 | White | 248/226 |
| 3,126,191 | 3/1964 | Holden | 248/286 |
| 3,312,436 | 4/1967 | Beghetto, Jr. | 248/148 |
| 4,162,696 | 7/1979 | Sprung | 150/52 J |
| 4,270,721 | 6/1981 | Mainor, Jr. | 248/285 |
| 4,687,167 * | 8/1987 | Skalka et al. | 248/282 |
| 4,956,756 | 9/1990 | Hsiao | 362/226 |
| 5,092,552 * | 3/1992 | Dayton et al. | 248/280.1 |
| 5,204,817 | 4/1993 | Yoshida | 364/449 |
| 5,263,423 | 11/1993 | Anderson | 108/43 |
| 5,326,059 | 7/1994 | Pryor et al. | 248/231.7 |
| 5,332,185 | 7/1994 | Walker, III | 248/346 |
| 5,337,985 | 8/1994 | Hale | 248/174 |
| 5,339,222 | 8/1994 | Simmons et al. | 361/818 |
| 5,350,147 | 9/1994 | Paganus | 248/346 |
| 5,429,336 * | 7/1995 | Ko | 248/278 |
| 5,476,241 | 12/1995 | Helman | 248/286.1 |
| 5,503,361 | 4/1996 | Kan-O et al. | 248/688 |
| 5,918,841 * | 7/1999 | Sweere et al. | 248/123.11 |
| 5,924,665 * | 7/1999 | Sweere et al. | 248/285.1 |
| 5,931,102 * | 8/1999 | Grahl | 108/42 |
| 5,938,159 * | 8/1999 | Hung | 248/278.1 |
| 5,964,443 * | 10/1999 | Leveille | 248/478 |
| 5,967,479 * | 10/1999 | Sweere et al. | 248/280.11 |
| 5,975,474 * | 11/1999 | Kaplan et al. | 248/289.11 |
| 5,996,954 * | 12/1999 | Rosen et al. | 248/278.1 |
| 6,012,693 * | 1/2000 | Voeller et al. | 248/280.11 |

* cited by examiner

*Primary Examiner*—Ramon O. Ramirez
*Assistant Examiner*—Tan Le
(74) *Attorney, Agent, or Firm*—Shook, Hardy & Bacon, L.L.P.

(57) ABSTRACT

An apparatus is provided for removably mounting an electronic device to a surface and for positioning the device with respect to the surface. The apparatus includes a cradle securable to the electronic device and a pivot link, which has a first end and a second end. The first end being pivotally coupled to the cradle. The apparatus also includes a support having a mounting pedestal coupled thereto. The second end of the pivot link is pivotally coupled to the support. The apparatus has a base which has a lower face that can be coupled to the surface and an upper face. The upper face has a receiving slot for the pedestal, the slot having a shoulder extending thereabove to engage the pedestal. The slot further has an open end to allow the pedestal to be moved within the slot. The base further includes a releasable locking arm having a retaining ridge located in line with the open end of the slot to selectively hold the pedestal within the slot. The pedestal of the apparatus can be placed within the slot and held within the slot by the retaining ridge of the locking arm. Further, the electronic device can be positioned with respect to the surface by pivoting the cradle and the link, and by rotating the pedestal within the slot.

26 Claims, 6 Drawing Sheets

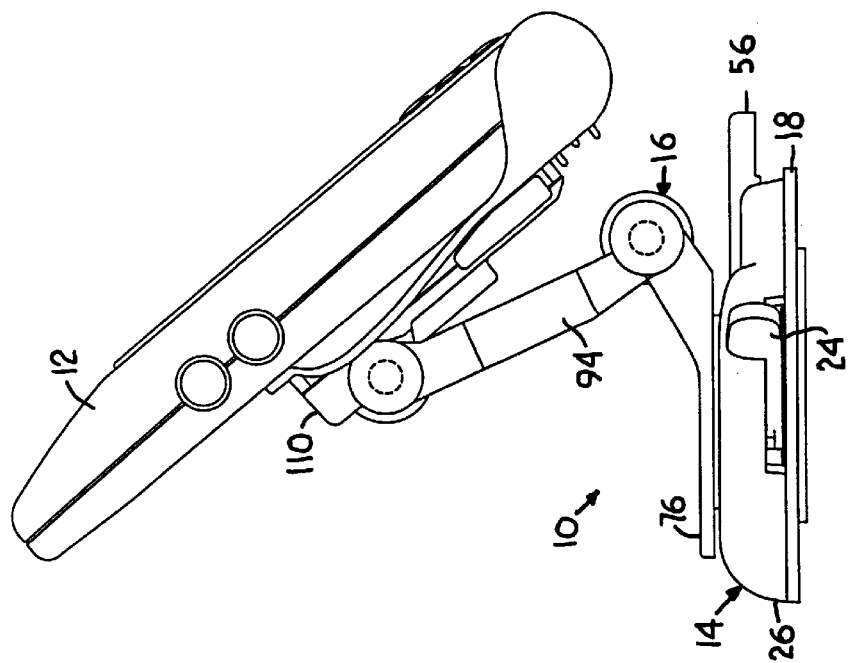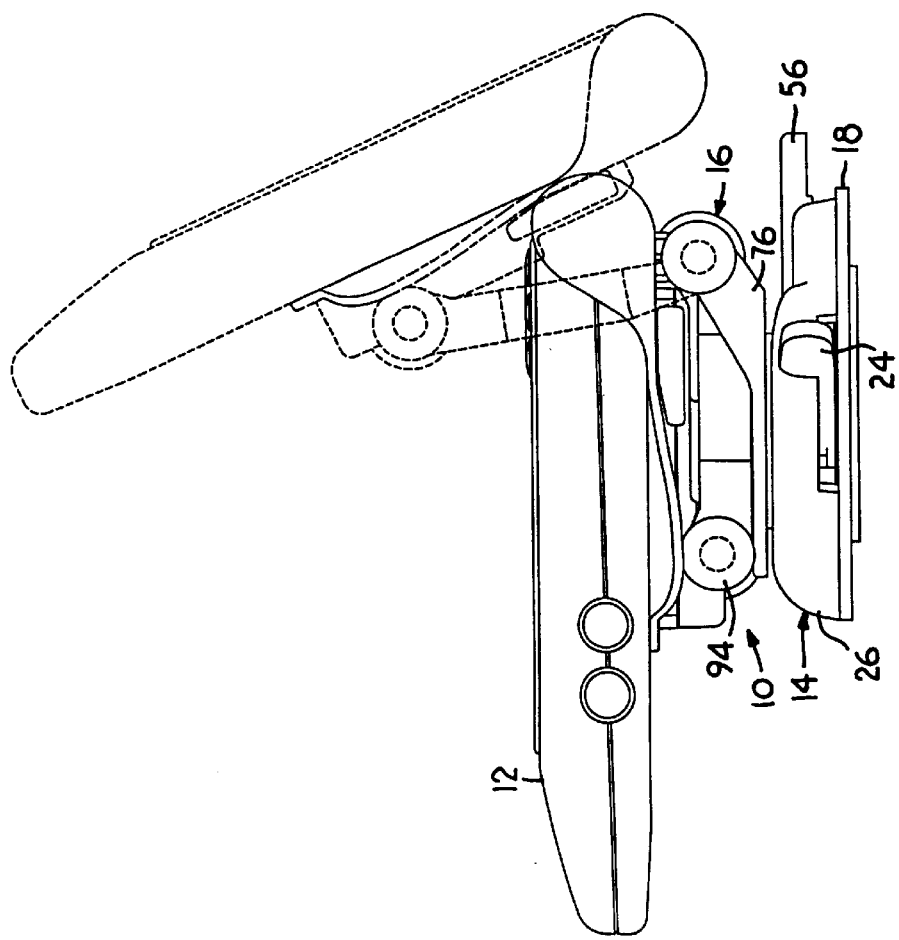

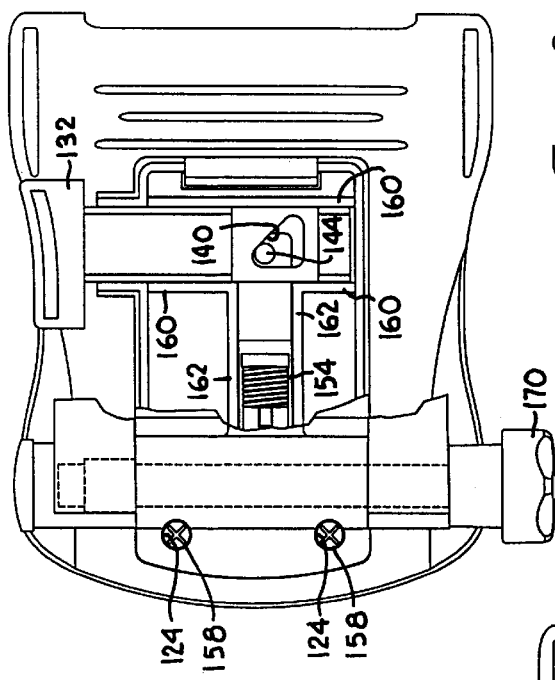
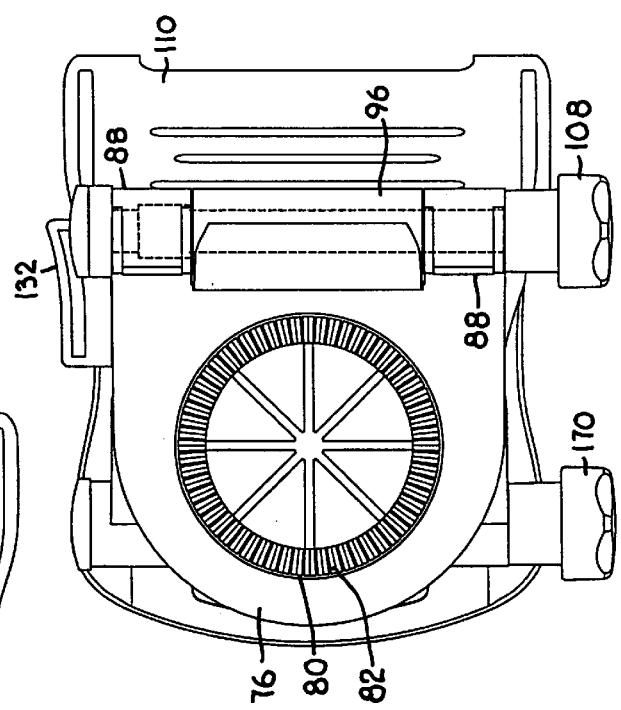
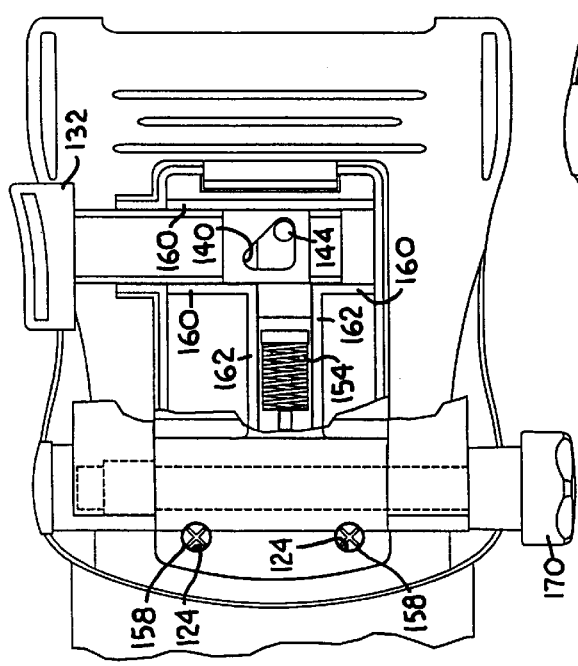

MULTI-POSITION ARTICULATING MOUNTING APPARATUS FOR AN ELECTRONIC DEVICE

STATEMENT REGARDING FEDERALLY SPONSORED RESEARCH OR DEVELOPMENT

Not Applicable.

CROSS REFERENCE TO RELATED APPLICATIONS

Not Applicable.

BACKGROUND OF THE INVENTION

The present invention relates to a mounting apparatus for an electronic device. More specifically, the invention relates to a mounting apparatus for an electronic device for use in a vehicle, which allows the electronic device to be selectively rotated and placed in a number of positions, and which allows the electronic device to be placed within, and removed from, a mounted position with one hand.

Electronic devices are being used more and more frequently in vehicles. For example, global positioning satellite devices are currently being used in vehicles and elsewhere. These devices are used for navigational purposes and are either permanently installed in a vehicle, or mounted so as to be portable. Further, these devices have a screen which visibly communicates information to the user thereof. The portable device is advantageous in that it can be taken from the vehicle and used outside of the vehicle, thus adding value to the device.

The mounting of portable devices within vehicles does, however, present a number of disadvantages. First, it is more difficult to mount a portable device in a location within the vehicle that allows its screen to be easily viewed. Devices that are permanently installed in the vehicle can be mounted within the dashboard of the vehicle, easily within sight of the vehicle driver or passenger. Portable devices must, however, be mounted somewhere within the interior of the vehicle, such as on top of the dashboard. This mounting position presents the challenge of mounting the device in an orientation and position that can be seen and accessed.

Viewing the screen of a portable electronic device can be hampered if the angle of the viewing screen is fixed relative to the surface on which the device is mounted. A fixed viewing angle may limit the vehicles on which the device can be effectively mounted due to varying dashboard configurations as well as varying driver and passenger heights. In other words, a fixed viewing angle may impair the user's ability to effectively and comfortably view the screen. Second, these electronic devices are often under-utilized if they are only viewable by the driver of the vehicle, but not passengers riding therein. Often the passenger in the vehicle is acting as the navigator. In these situations, it is advantageous for the passenger to be able to view the global positioning satellite device.

Third, depending on the configuration of the dashboard surface on which the device is mounted, it may be necessary to either elevate or lower the device with respect to the mounting surface in order to get a clearer view of the device. A rigid mounting apparatus that does not offer the ability to manipulate the orientation of the device relative to the mounting surface is therefore disadvantageous.

As may be appreciated, it would also be advantageous to be able to place the electronic device into a mounted position using only one hand. Similarly, it would be advantageous to remove the electronic device from a mounted position using only one hand.

Therefore, a mounting apparatus is needed that can be used to mount a portable electronic device within a vehicle so that the device can be easily viewed and adjusted. Further, a mounting apparatus is needed that allows an electronic device to be mounted within a vehicle so that it is viewable by either the driver or the passenger riding therein. Still further, a mounting apparatus is needed that allows an electronic device to be mounted within, and removed from, a mounted position using only one hand. Finally, a mounting apparatus is needed that can be used to either elevate or lower, and manipulate the orientation of the device relative to the surface on which the apparatus is mounted.

SUMMARY OF THE INVENTION

It is an object of the present invention to provide a mounting apparatus for an electronic device within a vehicle so that the device can be easily viewed and that allows the angle of the device relative to the user to be adjusted.

It is a further object of this invention to provide a mounting apparatus that selectively allows either the driver or the passenger of a vehicle in which the device is mounted to view the device.

It is another feature of this invention to provide a mounting apparatus that allows a device mounted therein to be either raised or lowered, and manipulated relative to the surface on which the apparatus is mounted.

It is still another object of the present invention to provide a mounting apparatus for an electronic device that allows the electronic device to be mounted within, and removed from, a mounted position using only one hand.

According to the present invention, the foregoing and other objects are obtained by an apparatus for removably mounting an electronic device to a surface and for positioning the device with respect to the surface. The appatus includes a cradle that is adapted to be releasably secured to the electronic device and a pivot link, which has a first end and a second end, the first end being pivotally coupled to the cradle. The apparatus also includes a support having a mounting pedestal coupled thereto. The second end of the pivot link is pivotally coupled to the support. The apparatus has a base which has a lower face that can be coupled to the surface and an upper face. The upper face has a receiving slot for the pedestal, the slot having a shoulder extending thereabove to engage the pedestal. The slot further has an open end to allow the pedestal to be moved within the slot. The base further includes a releasable locking arm having a retaining ridge located in line with the open end of the slot to selectively hold the pedestal within the slot. The pedestal of the apparatus can be placed within the slot and held within the slot by the retaining ridge of the locking arm. Further, the electronic device can be positioned with respect to the surface by pivoting the cradle and the link, and by rotating the pedestal within the slot.

Additional objects, advantages, and novel features of the invention will be set forth in part in the description which follows, and in part will become apparent to those skilled in the practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

In the accompanying drawings which form a part of the specification and which are to be read in conjunction therewith and in which like reference numerals are used to indicate like parts in the various views:

FIG. 1 is a side elevation view of the mounting apparatus according to the present invention, with a different orientation being shown in phantom lines;

FIG. 2 is a side elevation view similar to FIG. 1, showing the mounting bracket in a different orientation;

FIG. 7 partial view of the mounting apparatus taken along line 7—7 of FIG. 5, showing the latching mechanism with parts being broken away to show particular details of construction;

FIG. 8 is a view similar to FIG. 7 but taken along line 8—8 of FIG. 6 with lines being broken away to show particular details of construction;

FIG. 9 is a view taken along line 9—9 of FIG. 6;

DESCRIPTION OF THE INVENTION

Figure 3:
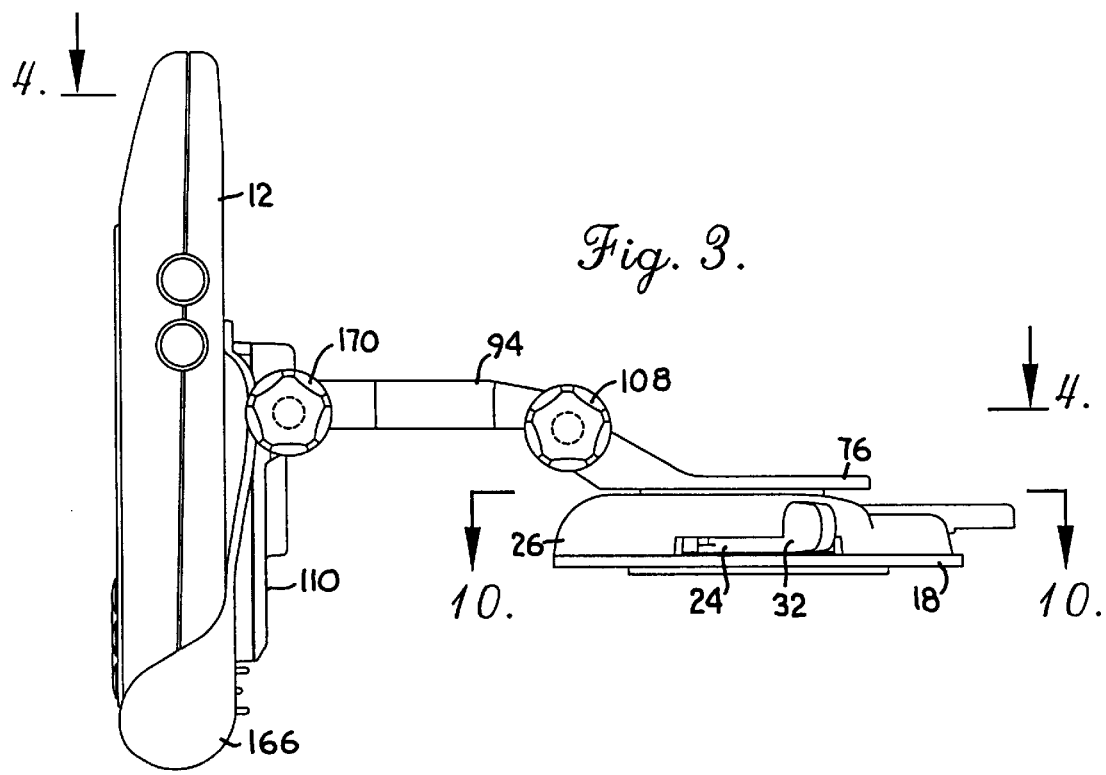
FIG. 3 is another side elevation view of the mounting device shown with the mounting bracket rotated and in an extended position.

Referring initially to FIGS. 1 and 2, a mounting embodying the principles of this invention is broadly designated in the drawings by reference numeral 10. Apparatus 10 is used to hold an electronic device 12 on a surface, such as a vehicle dash. Electronic device 12 can be, for example, a global positioning satellite device. Such a device normally includes some type of viewing screen, which visually conveys information to the user of the device. Apparatus 10 includes a base 14 and a mounting bracket 16. As described below, base 14 is coupled to the desired surface and is used to releasably hold mounting bracket 16. Bracket 16 is releasably coupled to the electronic device and is constructed to be releasably held within base 14.

Figure 10:
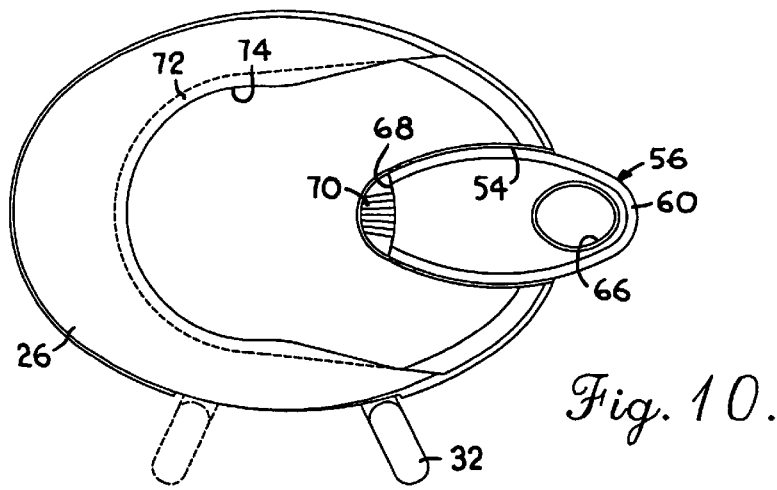
FIG. 10 is a view taken along line 10—10 of FIG. 3.
Figure 11:
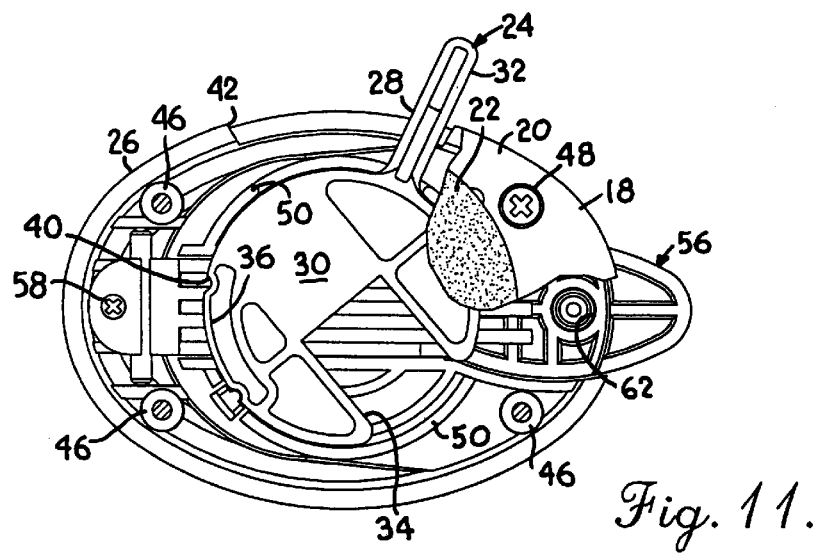
FIG. 11 is a bottom view of the base shown in FIG. 10, with parts being broken away to show particular details of construction.
Figure 12:
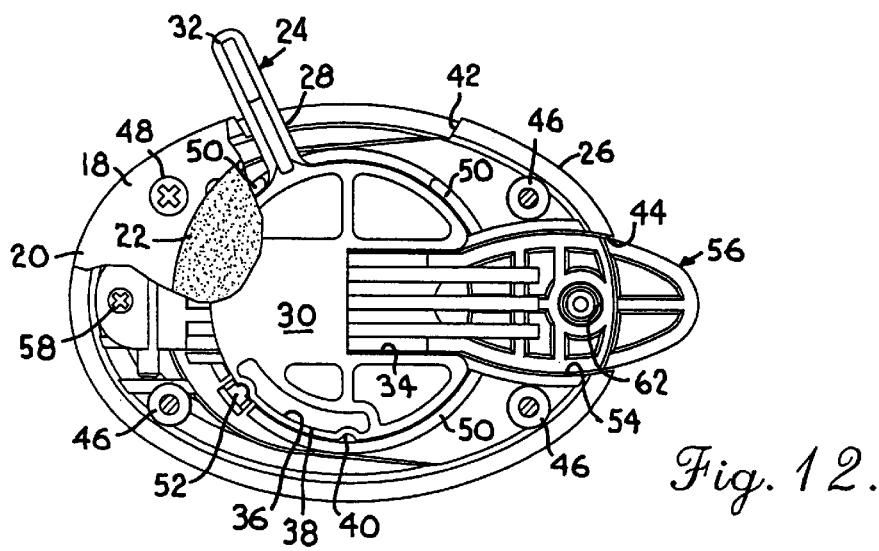
FIG. 12 is a view similar to FIG. 11 showing the locking tab in a different orientation.

Base 14 is constructed and assembled as described in a co-pending patent application, filed Nov. 16, 1998 entitled Mounting Apparatus For An Electronic Device, the specification of which is hereby incorporated by reference. As best seen in FIGS. 10–12, base 14 has a lower section 18 with an exterior surface 20, which has an inset 22 formed therein. Inset 22 is used to attach exterior surface 20 to the desired surface, such as a vehicle dash. In use, an adhesive material may be applied within inset 22, which can then be placed on the desired surface. Alternatively, a suitable adhesive putty may be used to attach base 14 to the desired surface, with inset 22 controlling the location of the putty.

Base 14 further has a locking tab 24 held between lower section 18 and an upper section 26. Tab 24 has an outwardly extending handle 28 that is connected to an operative key section 30. Preferably, handle 28 and key section 30 are integrally formed from one piece. Handle 28 may be equipped with an enlarged head 32 for easier grasping by the user thereof. Key section 30 has a u-shaped slot 34 formed therein which is used to either prevent or allow bracket 16 to be removed from base 14, as is more fully described below. Located about one portion of the outer perimeter of key section 30 is an arcuate slot 36. As best seen in FIGS. 11 and 12, the outermost wall 38 defining slot 36 is relatively thin and has a depression 40 formed in each end thereof Upper section 26 has a first gap 42 and a second gap 44 formed therein. First gap 42 allows clearance for handle 28 of locking tab 24, and allows clearance for rotational movement of handle 28 about an axis in the center of key section 30. Second gap 44 allows clearance for a locking arm, as is more fully described below. Located within upper section 26 are a number of threaded columns 46. A screw 48 is placed through lower section 18 and is threaded into each column 46, thereby securing lower section 18 to upper section 26.

Also located within the interior of upper section 26 is a series of arcuate retaining walls 50. As best seen in FIGS. 11 and 12, there are preferably three walls 50, with one wall being longer than the other two. Walls 50 are located to form a perimeter that is slightly larger that the outer perimeter of key section 30, and act to retain key section 30 within walls 50. The two shorter walls 50 are spaced from one another to allow clearance for handle 28, and to allow clearance for rotational movement of the handle. Generally, the two shorter walls 50 are spaced a corresponding distance to match the size of first gap 42. The space between each of the shorter walls 50 and longer wall 50 allows clearance for a locking arm, as is more fully described below. Longer wall 50 has a detent 52 formed therein. Detent 52 is flexibly mounted within upper section 26, so that it can move toward and away from locking tab 24. In use, as is more fully described below, detent 52 is located within one of the two depressions 40 to hold locking tab 24 in either an open or a closed position. Upper section 26 further has a c-shaped cut-out 54 extending therethrough. Cut-out 54 is generally located between one of the shorter walls 50 and the longer wall 50. Cut-out 54 allows clearance for a locking arm 56.

Figure 5:
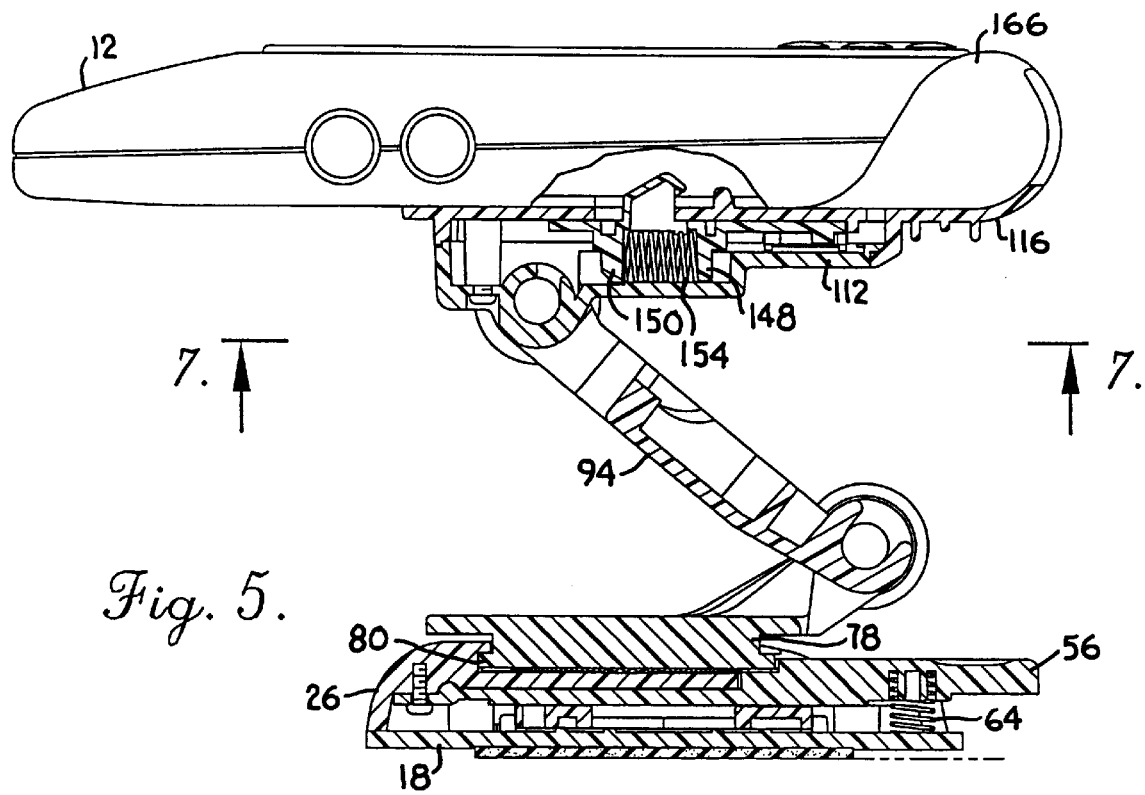
FIG. 5 is a cross-sectional view of the mounting device shown with an electronic device mounted there being broken away to show particular details of construction.

Locking arm 56 is secured within upper section 26 at a location distal from second gap 44. Arm 56 is secured to upper section 26 with a suitable attaching mechanism, such as a screw or rivet, as shown at 58. Other suitable attaching mechanisms could be used, so long as one end of arm 56 is secured to upper section 26. Arm 56 has an elongated portion terminating at a button 60. The elongated portion has a width that is slightly less than the width of slot 34 in key section 30, so that it may pass between slot 34, when slot 34 is in alignment with arm 56. Button 60 is shaped to fit within cut-out 54 so that it may travel within the cut-out, and is sized to extend beyond the perimeter of upper section 26. As best seen in FIG. 12, button 60 is preferably generally oval in shape and has a spring chamber 62 formed in the bottom thereof. As best seen in FIG. 5, chamber 62 is used to locate and retain a spring 64 between button 60 and lower section 18. Spring 64 operates to bias arm 56 upwardly, the importance of which is described below. As best seen in FIG. 10, on the upper surface of button 60, a hollow 66 is presented to assist the user in comfortably depressing arm 56. Also on the upper surface of button 60 is an arcuate retaining ridge 68 and a pawl surface 70. Both ridge 68 and pawl surface 70 are distal from hollow 66. Ridge 68 is arcuate in shape and is formed by a vertical wall terminating at the upper-most surface of button 60. As best seen in FIG. 10, pawl surface 70 is a series of ridges, extending from ridge 68 to the end of button 60, and is located below the upper-most surface of button 60.

The exterior portion of upper section 26 includes an elevated shoulder 72 that defines a receiving slot 74. Slot 74 is generally c-shaped and has a generally semi-circular portion and an extending portion which is tapered outwardly. The outward taper is used to guide bracket 16 into place, as is more fully described below. As best seen in FIG. 10, shoulder 72 extends outwardly over slot 74 and defines a receiving channel that is shaped as is slot 74.

In assembling base 14, locking tab 24 is placed on lower section 18 and within arcuate retaining walls 50 of upper section 26. Tab 24 is located such that detent 52 is within one of the depressions 40, with handle 28 protruding from upper section 26 through first gap 42. Locking arm 56 is secured to upper section 26 and spring 64 is placed within chamber 62 to bias arm 56 upwardly. Upper section 26 and lower section 18 are then secured together by placing screws 48 through lower section 18 and threading them into columns 46. With this construction, tab 24 may be rotated between two positions, and held in one of two positions by locating detent 52 within one of the two depressions 40. When rotating tab 24 between the two positions, detent 52 slides along the thin portion of wall 38 and forces it slightly inwardly, due to an inward bias of detent 52. In one position, slot 34 is placed in alignment with the elongated portion of arm 56. In this position, arm 56 can be moved downwardly by depressing button 60. Button 60 is allowed enough clearance to place retaining ridge 68 below the adjacent surface of upper section 26. In the other position, slot 34 is oriented at an angle relative to the elongated portion of arm 56. In this position, arm 56 and button 60 are prevented from moving downwardly. If button 60 is pressed when locking tab 24 is in this position, arm 56 is prevented from downward movement by key section 30, because slot 34 is not aligned with arm 56. In this position, retaining ridge 68 and pawl surface 70 are both positively held above the adjacent surface of upper section 26.

Figure 6:
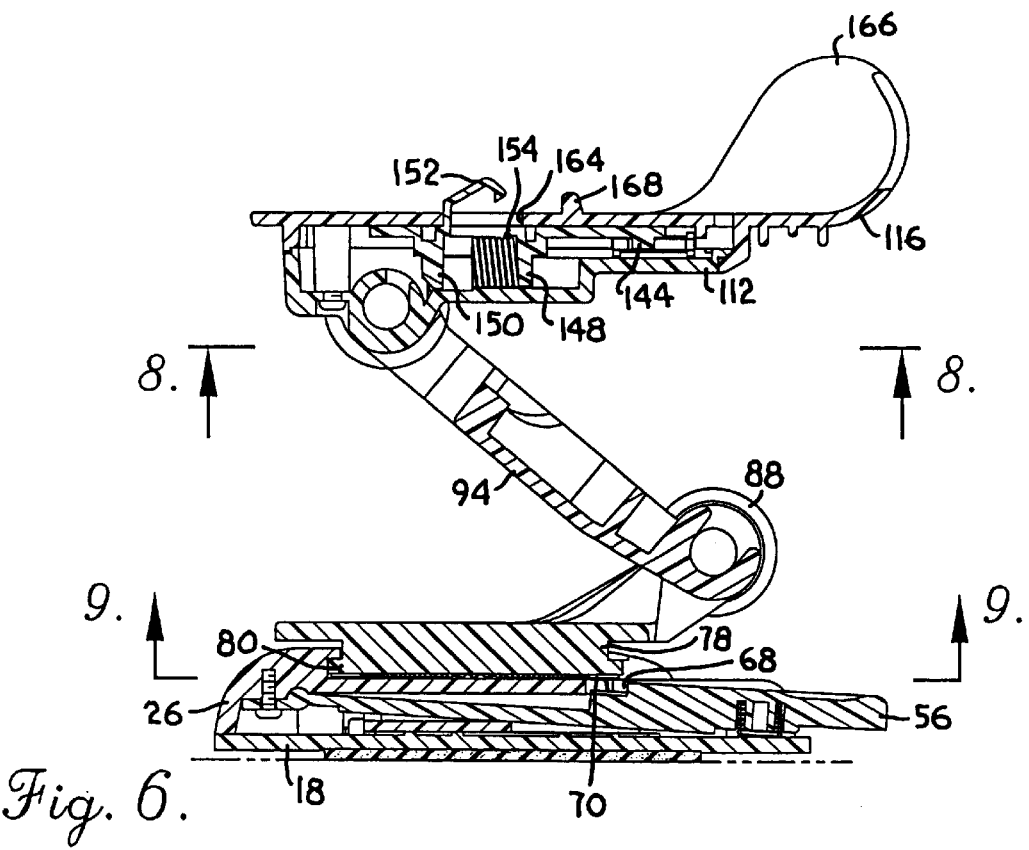
FIG. 6 is a view similar to FIG. 5 shown without the electronic device.
Figure 13:
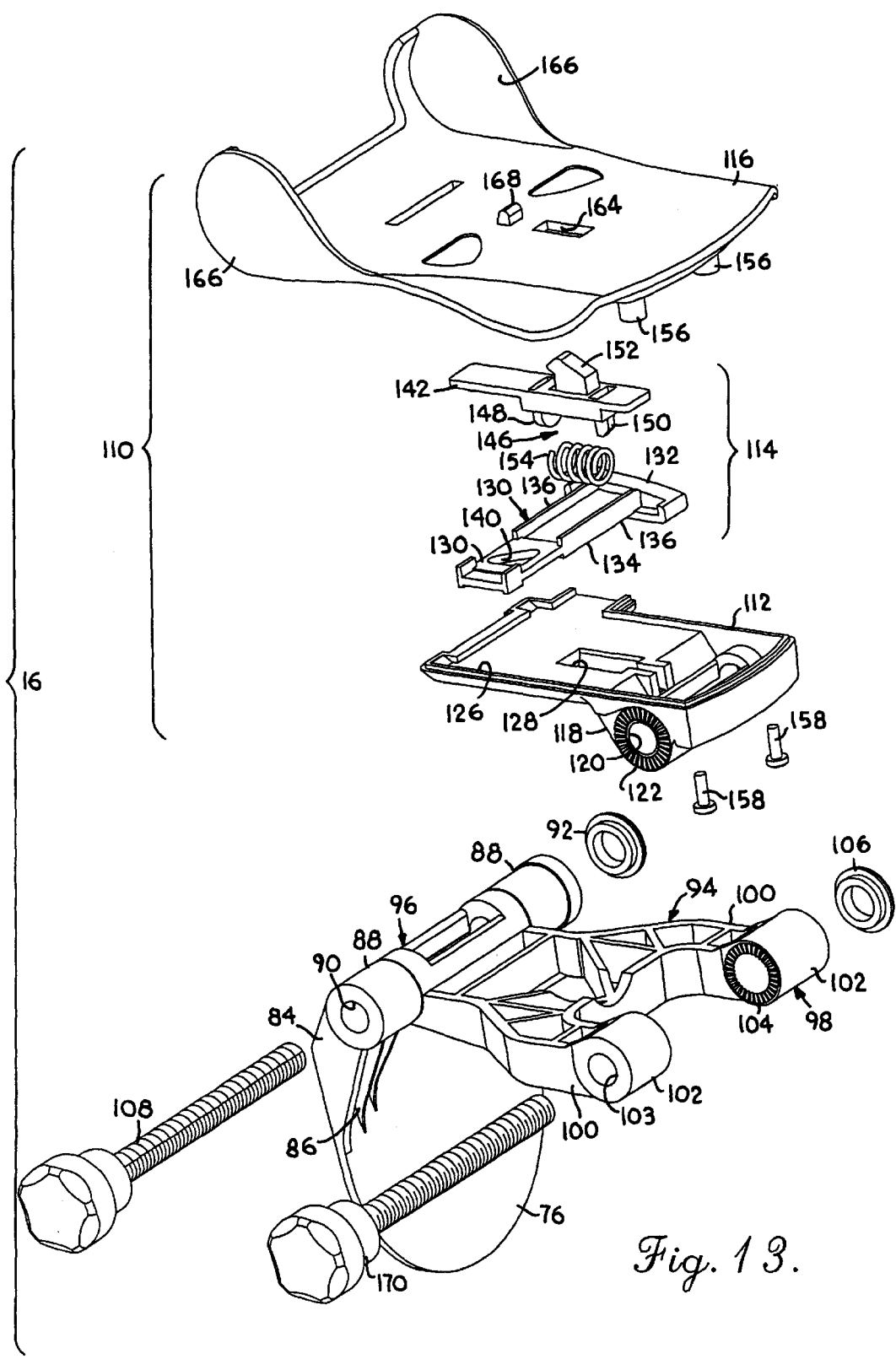
FIG. 13 is an exploded view of the mounting bracket of the present invention.

Base 14 is used to secure electronic device 12 in place on a surface, in cooperation with bracket 16. As best seen in FIGS. 5, 6 and 13, bracket 16 includes a support 76 which is preferably made from a molded plastic. Support 76 has a pedestal 78 extending downwardly therefrom. As best seen in FIGS. 5 and 9, pedestal 78 is preferably cylindrical and includes a platform 80. Platform 80 has a slightly larger radius than the adjacent portion of pedestal 78. Further, platform 80 has a lower ratchet surface 82, as best seen in FIG. 9. As is more fully described below, pedestal 78 and platform 80 are placed within slot 74 of base 14. In this orientation, a portion of ratchet surface 82 engages pawl surface 70 of locking arm 56.

Support 76 further has a pair of outer legs 84 and a number of braces 86 extending from its upper surface. At the outer most end of legs 84 and braces 86 are a pair of pivot bushings 88. As best seen in FIG. 13, pivot bushings 88 are arranged so that a gap extends therebetween. Preferably, bushings 88 are integrally formed with legs 84 and braces 86 to be an integral part of support 76. Extending through both bushings 88 is a hole 90. Both bushings 88 are therefore similar in many respects. However, a threaded insert is inserted in the outer end of one pivot bushing 88. The insert is threaded to receive the threaded end of a pivot rod, as is more fully described below. An end cap 92 is inserted into this pivot bushing 88 to hide the threaded insert from view. Surrounding hole 90 on the surface of bushings 88 nearest the gap between the bushings is an annular toothed surface (not shown).

Bracket 16 further includes a pivot link 94. As best seen in FIG. 13, link 94 is preferably generally Y-shaped. Link 94 has a first end 96 that is approximately the same width as the gap between bushings 88. End 96 has a hole extending therethrough that can be placed in alignment with hole 90. Surrounding the hole on each outer side of end 96 is an annular toothed surface. This toothed surface is preferably of the same diameter as the toothed surface surrounding hole 90 and is formed to engage and interlock therewith.

Link 94 has a second end 98 that is equipped with a pair of upwardly extending arms 100 that form a gap or opening extending between the two arms. Each arm 100 is equipped with a pivot bushing 102. Preferably, bushings 102 are integrally formed with link 94. Each bushing 102 has a hole 103 extending therethrough. Further, each bushing 102 has an annular toothed surface 104 extending about hole 103 on the side of arm 100 adjacent the gap between the two arms. One bushing 102 has a threaded insert (not shown) press-fit therein, that allows a pivot rod to be secured therein, as is more fully described below. The bushing 102 having the threaded insert therein has an end cap 106 inserted into the outside thereof to hide the threaded insert from view.

Link 94 is pivotally coupled to support 76 by placing a pivot rod 108 through pivot bushings 88 and the hole in end 96. More specifically, rod 108 is threaded into the threaded insert in one bushing 88. When this is done, the toothed surfaces of bushings 88 will be engaged and held against the toothed surfaces surrounding the hole in end 96 of pivot link 94. This will prevent pivot link 94 from rotating with respect to support 76.

As best seen in FIG. 13, bracket 16 further includes a cradle 110 which is used to hold and receive the electronic device 12 and which is pivotally connected to second end 98 of link 94. Cradle 110 has a rear cover 112, a latch mechanism 114 and a front cover 116. Rear cover 112 includes a pair of integral pivot bushings 118 that extend away from the rear surface of cover 112. Extending through bushings 118 is a hole 120. Surrounding hole 120 on the outer surface of pivot bushings 118 is a toothed annular surface 122, which is formed to matingly connect with toothed surfaces 104. The distance between each toothed surface 122 is approximately equal to the gap formed between arms 100. As best seen in FIGS. 7 and 8, near pivot bushings 118 and extending through rear cover 112 are a pair of holes 124 which are used to couple rear cover 112 to front cover 116, as is more fully described below.

The unexposed or interior side of rear cover 112 is formed to have a latch chamber 126 and a spring receiving chamber 128, which accommodate latch mechanism 114. Latch mechanism 114 is located between rear cover 112 and front cover 116. Mechanism 114 includes a latch release 130 that is equipped with a push lever 132, that extends outwardly of the interior of covers 112 and 116. Extending from lever 132 into the interior of cradle 110 is an elongated portion 134 of release 130. Portion 134 includes a pair of slide rails 136, one surface of which rests upon and within latch chamber 126. Portion 134 also includes a camming area 138, extending through which is a camming opening 140. As best seen in FIGS. 7, 8 and 13, opening 140 is preferably triangular in shape and oriented so as to have a diagonal leg extending across portion 134. Opening 140 has a follower retaining notch 141 located therein which acts to positively retain a cam follower, as is described below. Release 130 is allowed to travel back and forth within chamber 126, sliding along rails 136.

Latch mechanism 114 further includes a device latch 142. Latch 142 has a cam follower 144 extending downwardly therefrom, as best seen in FIGS. 7 and 8. Preferably, follower 144 is cylindrically shaped and located to travel within camming opening 140. In the closed position, follower 144 is retained within notch 141, as shown in FIG. 7. Also located on the lower surface of latch 142 is a spring retainer 146. Retainer 146 includes a somewhat circular member 148 and a confining member 150. Members 148 and 150 are located a selected distance from one another so that they fit within spring receiving chamber 128. In use, latch 142 travels within latch chamber 126. More specifically, cam follower 144 is located within cam opening 140. Further, a spring 154 is placed within spring retainer 146 by locating it between members 148 and 150. Extending from the upper surface of latch 142 is a catch 152 that is shaped to engage electronic device 12 and hold device 12 against and within cradle 110.

With latch mechanism 114 within latch chamber 126, rear cover 112 is secured to front cover 116. As best in FIG. 13, cover 116 has a pair of theaded columns 156 which are located to align with holes 124. To secure rear cover 112 to front cover 116 a pair of screws 158 are threaded into columns 156 after being placed through holes 124. Front cover 116 has extending from its lower surface a latch chamber that aligns with chamber 126 and is used to contain and guide latch mechanism 114. More specifically, as best seen in FIGS. 7 and 8, the latch chamber is provided a pair of latch guide rails 160 and a pair of release guide rails 162. Latch release 130 travels within rails 162 and latch 142 travels within rails 160. Extending through front cover 116 is a catch opening 164. Opening 164 is located to align with catch 152 of device latch 142. Opening 164 is sized to be larger than catch 152 to allow catch 152 to travel longitudinally along opening 164.

The upper surface of front cover 116 is shaped to receive the electronic device 12. Device 12 can be coupled to cradle 110 with latch mechanism 114. More specifically, the upper surface of front cover 116 has a pair of retaining ears 166 which cooperate with latch mechanism 114 to retain electronic device 12 within cradle 110. Attached to the upper surface of front cover 116 adjacent catch opening 164 is a biasing mechanism 168. Preferably, mechanism 168 is made from a resilient sponge rubber material which acts to exert an outward force on electronic device 12 after it has been placed in cradle 110.

Cradle 110 is held within mounting bracket 16 by placing a pivot rod 170 through holes 103 of pivot bushings 102 and hole 120 on rear cover 112. In this orientation, toothed surface 122 aligns with toothed surfaces 104. Pivot rod 170 may be equipped with a knob on one end and has a threaded end which can be inserted into and threaded into the threaded insert in one bushing 102. When the knob of rod 170 is fully tightened so that the threaded end is fully received within the threaded insert, surfaces 104 interlock with toothed surfaces 122, preventing cradle 110 from moving with respect to pivot link 94.

In use, electronic device 12 is placed within bracket 16 by coupling the device within cradle 110. More specifically, catch 152 is placed within a receiving chamber on device 12. Catch 152 is able to travel longitudinally within catch opening 164. Catch 152 is cammed in one direction, against the bias of spring 154, upon placing device 12 within cradle 110. Once the catch is within the receiving chamber of device 12, it is moved by spring 154 into a holding relationship with device 12. To release device 12 from cradle 110, latch release 130 is pushed inwardly by pushing on push lever 132. This motion forces cam follower 144 to travel along the diagonal surface of camming opening 140, which in turn forces latch 142 into a position which allows removal of the device. Apparatus 10 therefore allows the device to be quickly and easily removed from base 14 with one hand by depressing push lever 132 and therefore maintains the portability of device 12. Device 12 therefore maintains portability, while allowing it to be mounted within a vehicle for optimal viewing.

To secure device 12 within a vehicle, the base 14 is first secured to the desired surface, such as a vehicle dash, by exposing an adhesive in the area of inset 22, or by placing an adhesive putty in the area of inset 22. To mount device 12 within base 14, locking tab 24 is moved to an open position, such that slot 34 is aligned with the elongated portion of locking arm 56. Pedestal 78 is then located within the base. More specifically, platform 80 is guided within the receiving channel of upper section 26, being guided along slot 74. Because locking tab 24 is in the open position, locking arm 56 is free to move downwardly. Thus, as platform 80 is placed on upper section 26, it can depress locking arm 56 and platform 80 can be moved into slot 74.

Figure 4:
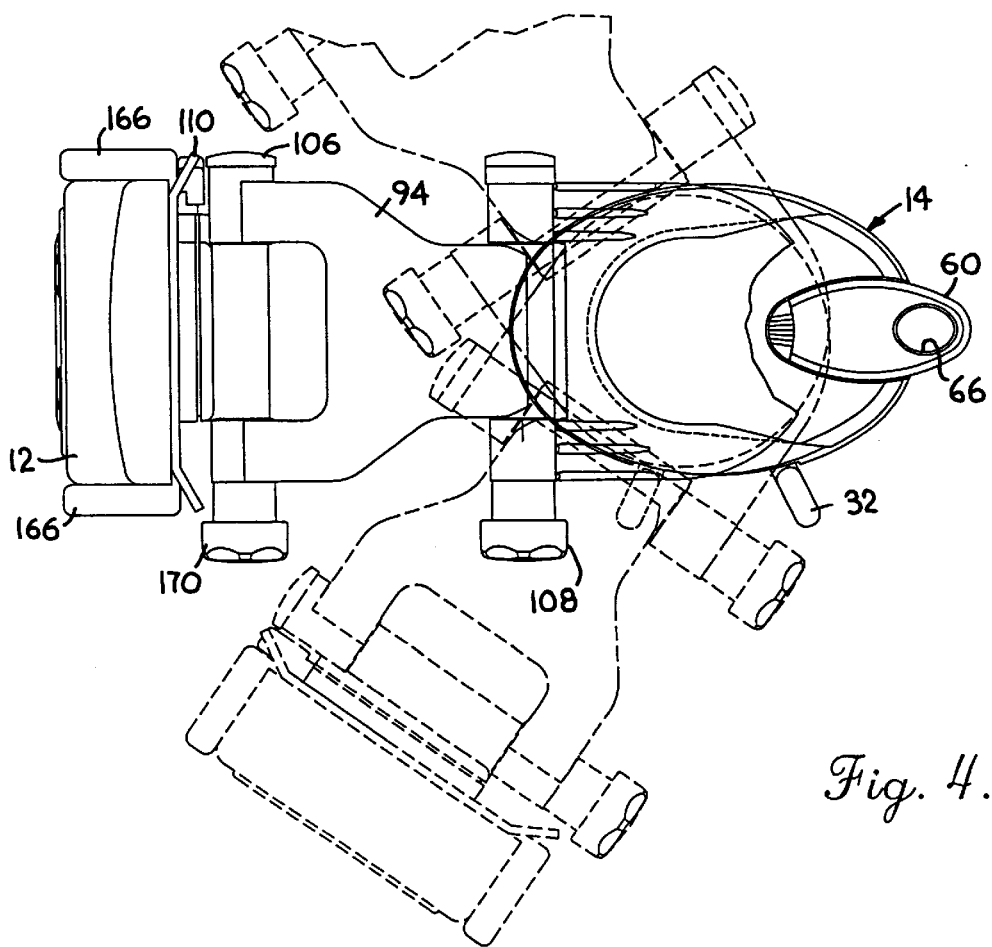
FIG. 4 is a view taken along line 4—4 of FIG. 3 with different rotational orientations shown in phantom lines.

When platform 80 is moved completely within slot 74, its outer perimeter will clear button 60 up to retaining ridge 68. Spring 64 will then act to move locking arm 56 upwardly and pawl surface 70 will be placed in engagement with ratchet surface 82 of platform 80. Retaining ridge 68 will then be in engagement with the outer perimeter of platform 80. In this orientation, bracket 16 and device 12 are prevented from moving beyond base 14 by retaining ridge 68. In order to remove device 12 from base 14, button 60 of locking arm 56 must be depressed to release retaining ridge 68 from engagement with platform 80. Further, in this orientation, device 12 can be rotated with respect to base 14. In this rotation, enough rotational force must be applied to overcome the spring force acting upwardly on pawl surface 70. Device 12 may be placed in any of a number of discrete rotational locations, as shown in FIG. 4, as pawl surface 70 is located along lower ratchet surface 82. This rotational movement allows device 12 to be positioned for the driver or passenger of the vehicle, as desired.

Once device 12 has been rotated to the desired location, locking tab 24 can be rotated to a closed position. In this position, slot 34 is not aligned with the elongated portion of locking arm 56. Therefore, in this position, pawl surface 70 is positively held against ratchet surface 82. The engagement of pawl surface 70 and ratchet surface 82 prevents further rotation of device 12 with respect to base 14. Further, in this position, retaining ridge 68 is positively held against platform 80, holding device 12 within base 14.

Device 12 can be pivoted upwardly and downwardly through bracket 16, as well as inwardly and outwardly. More specifically, if it is desired to reposition device 12, pivot rods 108 and 170 can be loosened. This allows cradle 110 to be pivoted with respect to link 94, and allows link 94 to be pivoted with respect to support 76, because the respective toothed surfaces are not held positively against one another. Such repositioning may be necessary, for example, depending on the slope of a vehicle's dashboard. Once cradle 110 and link 94 are moved into the desired orientation, pivot rods 108 and 170 can be tightened, securing device 12 and mounting bracket 16 in position by positively holding mating toothed surfaces against one another.

From the above movements, the viewing screen of device 12 can be optimally positioned for viewing by the user thereof. Apparatus 10 allows the device to be repositioned into a number of different orientations to optimize this viewing and allows the device to be secured in the desired orientation. As seen in FIG. 1, device 12 can be placed relatively close to and parallel with base 14. In this orientation, base 14, bracket 16 and electronic device 12 form a relatively compact assembly. As best seen in FIG. 2, device 12 can be raised to an angled position. This is accomplished by loosening rods 108 and 170. Pivot link 94 is therefore allowed to pivot about both rods into a desired orientation for electronic device 12. Thereafter, rods 108 and 170 can be tightened, thus securing the electronic device 12 in the desired orientation. Moreover, as best seen in FIG. 3, support 76 can be rotated to a different position from that shown in FIGS. 1 and 2. This is accomplished by releasing locking tab 24 which allows support 76 to pivot within base 14. FIG. 3 also shows a more fully extended orientation for bracket 16. Once in the desired orientation, rods 108 and 170 can be secured and locking tab 24 may be rotated to prevent support 76 from rotating out of position.

From the foregoing, it will be seen that this invention is one well adapted to attain all the ends and objects hereinabove set forth together with other advantages which are obvious and which are inherent to the structure. It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. An apparatus for removably mounting a portable, handheld electronic device to a surface and for positioning the device with respect to the surface, comprising:
    a cradle adapted to be releasably secured to the portable, handheld electronic device;
    a pivot link, having a first end and a second end, said second end being pivotally coupled to said cradle;
    a support having a mounting pedestal coupled thereto, said first end of said pivot link being pivotally coupled to said support; and
    a base having a lower section adapted to be coupled to the surface, and having an upper section adapted to rotatingly and releasably receive the pedestal of said support;
    wherein said upper section has a receiving slot for said pedestal, said slot having a shoulder extending thereabove to engage said pedestal and an open end adaopted to allow said pedestal to be moved within said slot, said base further including a releasable locking arm having a retaining ridge located in line with said open end of said slot, said arm thereby being adapted to selectively hold said pedestal within said slot; and
    wherein said pedestal can be placed within said upper section, and wherein the electronic device can be positioned with respect to the surface by pivoting said cradle and said link with respect to said support, and by rotating said pedestal within said upper section.

2. The apparatus of claim 1, wherein said pedestal has a lower ratchet surface and said locking arm has an upper pawl surface located to engage said ratchet surface when said pedestal is located within said slot, said ratchet and pawl surface providing a mechanism to hold said support and the electronic device in a desired rotational position.

3. The apparatus of claim 2, further comprising a biasing mechanism to bias said locking arm upwardly so that said retaining ridge engages said pedestal and so that said pawl surface engages said ratchet surface.

4. The apparatus of claim 3, further comprising a locking tab held between said lower section and said upper section of said base, said locking tab being rotatable between a first position that prevents disengagement of said pawl surface and said ratchet surface and a second position that allows disengagement of said pawl surface and said ratchet surface.

5. An apparatus for removably mounting a global positioning satellite device to a vehicle surface, comprising:
    a cradle adapted to be secured to the global positioning device;
    a pivot link, having a first end and a second end, said second end being pivotally coupled to said cradle;
    a support having a mounting pedestal coupled thereto, said first end of said pivot link being pivotally coupled to said support;
    a base having a lower section adapted to be coupled to the vehicle surface, and an upper section having a receiving slot for said pedestal, said slot having a shoulder extending thereabove to engage said pedestal and an open end adapted to allow said pedestal to be moved within said slot; and
    a releasable locking arm coupled to said base, said arm having a retaining ridge located in line with said open end of said slot and positioned to selectively hold said pedestal within said slot,
    wherein said pedestal is adapted to be placed within said slot and held within said slot by said retaining ridge of said locking arm, and wherein the global positioning device can be positioned with respect to the vehicle surface by pivoting said cradle and said link with respect to said support, and by rotating said pedestal within said slot.

6. The apparatus of claim 5, wherein said pedestal has a lower ratchet surface and said locking arm has an upper pawl surface located to engage said ratchet surface when said pedestal is located within said slot, said ratchet surface and pawl surface providing a mechanism to hold said support and the global positioning device in a desired rotational position.

7. The apparatus of claim 6, further comprising a biasing mechanism to bias said locking arm upwardly so that said retaining ridge engages said pedestal and so that said pawl surface engages said ratchet surface.

8. The apparatus of claim 7, further comprising a locking tab held between said upper face and said lower face of said base, said locking tab being rotatable between a first position that prevents disengagement of said pawl surface and said ratchet surface and a second position that allows disengagement of said pawl surface and said ratchet surface.

9. The apparatus of claim 5, further comprising a locking mechanism operably coupled between said cradle and said pivot link, said locking mechanism adapted to selectively prevent pivotal movement of said cradle with respect to said pivot link.

10. The apparatus of claim 9, further comprising a second locking mechanism operably coupled between said pivot link and said support, said second locking mechanism adapted to selectively prevent pivotal movement of said pivot link and said support.

11. The apparatus of claim 10, wherein said cradle contains a releasable latching mechanism adapted to releasably engage the global positioning device, said mechanism having a moveable catch which protrudes upwardly from said cradle and which is adapted to releasably hold said device within said cradle.

12. An apparatus for removably mounting a portable, handheld electronic device to a surface and for positioning the device with respect to the surface, comprising:
    an articulating mounting bracket having at least two pivot points and adapted to releasably hold the portable, handheld electronic device, wherein said mounting bracket further comprises a cradle for releasably securing the portable, handheld electronic device, wherein said cradle includes a portion for at least partially surrounding the electronic device; and
    a holder for releasably and rotatingly holding said bracket and for coupling said bracket to the surface,
    wherein said holder is adapted to be coupled to the surface, and wherein the electronic device can be positioned with respect to the surface by pivoting said bracket about the pivot points and by rotating said bracket within said holding means.

13. The apparatus of claim 12, wherein said bracket further comprises:
    a pivot link, having a first end and a second end, said second end being pivotally coupled to said cradle; and
    a support having a mounting pedestal coupled thereto, said first end of said pivot link being pivotally coupled to said support.

14. The apparatus of claim 13, further comprising a locking mechanism operably coupled between said cradle and said pivot link.

15. The apparatus of claim 13, further comprising a second locking mechanism operably coupled between said pivot link and said support.

16. The apparatus of claim 12, wherein said cradle contains a releasable latching mechanism that releasably engages the electronic device, said mechanism having moveable finger which protrudes upwardly from a surface of said cradle to hold said device within said cradle.

17. A mounting assembly in combination with a portable, handheld electronic device having a back face and a front face, the front face having a display, wherein the back face of the electronic device is adapted to be held in a palm of a hand of a user, said combination comprising:

a cradle for releasably securing the portable, handheld electronic device such that the back face rests against the cradle;

a pivot link, having a first end and a second end, said second end being pivotally coupled to said cradle;

support having a mounting pedestal coupled thereto, said first end of said pivot link being pivotally coupled to said support; and a base having a lower section adapted to be coupled to the surface, and having an upper section adapted to rotatingly and releasably receive the pedestal of said support, wherein said upper section has a receiving slot for said pedestal, said slot having a shoulder extending thereabove to engage said pedestal and an open end adapted to allow said pedestal to be moved within said slot, said base further including a releasable locking arm having a retaining ridge located in line with said open end of said slot, said arm thereby being adapted to selectively hold said pedestal within said slot, and wherein said pedestal can be placed within said upper section, and wherein the electronic device can be positioned with respect to the surface by pivoting said cradle and said link with respect to said support, and by rotating said pedestal within said upper section.

18. The combination of claim 17, wherein said pedestal has a lower ratchet surface and said locking arm has an upper pawl surface located to engage said ratchet surface when said pedestal is located within said slot, said ratchet and pawl surface providing a mechanism to hold said support and the electronic device in a desired rotational position.

19. The combination of claim 18, further comprising a biasing mechanism to bias said locking arm upwardly so that said retaining ridge engages said pedestal and so that said pawl surface engages said ratchet surface.

20. The combination of claim 19, further comprising a locking tab held between said lower section and said upper section of said base, said locking tab being rotatable between a first position that prevents disengagement of said pawl surface and said ratchet surface and a second position that allows disengagement of said pawl surface and said ratchet surface.

21. An apparatus for removably mounting a portable, handheld electronic device to a surface and for positioning the device with respect to the surface, comprising:

a cradle for releasably securing the portable, electronic device;

a pivot link, having a first end and a second end, said second end being pivotally coupled to said cradle;

a support having a mounting pedestal coupled thereto, said first end of said pivot link being pivotally coupled to said support;

a base having a lower section adapted to be coupled to the surface, and having an upper section adapted to rotatingly and releasably receive the pedestal of said support; and a locking mechanism operably coupled between said cradle and said pivot link, said locking mechanism adapted to selectively prevent pivotal movement of said cradle with respect to said pivot link, wherein said pedestal can be placed within said upper section, and wherein the electronic device can be positioned with respect to the surface by pivoting said cradle and said link with respect to said support, and by rotating said pedestal within said upper section.

22. The apparatus of claim 21, further comprising a second locking mechanism operably coupled between said pivot link and said support, said second locking mechanism adapted to selectively prevent pivotal movement of said link with respect to said support.

23. The apparatus of claim 22, wherein said cradle contains a releasable latching mechanism adapted to releasably engage the electronic device, said mechanism having a moveable release, said release being operable with one hand to release said mechanism from engagement with the device.

24. A mounting assembly in combination with a portable, handheld electronic device having a back face and a front face, the front face having a display, wherein the back face of the electronic device is adapted to be held in a palm of a hand of a user, said combination comprising:

a cradle for releasably securing the portable, handheld electronic device such that the back face rests against the cradle;

a pivot link, having a first end and a second end, said second end being pivotally coupled to said cradle;

a support having a mounting pedestal coupled thereto, said first end of said pivot link being pivotally coupled to said support;

a base having a lower section adapted to be coupled to the surface, and having an upper section adapted to rotatingly and releasably receive the pedestal of said support; and a locking mechanism operably coupled between said cradle and said pivot link, said locking mechanism adapted to selectively prevent pivotal movement of said cradle with respect to said pivot link, wherein said pedestal can be placed within said upper section, and wherein the electronic device can be positioned with respect to the surface by pivoting said cradle and said link with respect to said support, and by rotating said pedestal within said upper section.

25. The combination of claim 24, further comprising a second locking mechanism operably coupled between said pivot link and said support, said second locking mechanism adapted to selectively prevent pivotal movement of said link with respect to said support.

26. The combination of claim 25, wherein said cradle contains a releasable latching mechanism adapted to releasably engage the electronic device, said mechanism having a moveable release, said release being operable with one hand to release said mechanism from engagement with the device.

* * * * *